Alfred Ernest Girling
Inventor
By
Cushman, Darby & Cushman
Attorneys

Alfred Ernest Girling
Inventor
By
Cushman, Darby & Cushman
Attorneys

Alfred Ernest Girling
Inventor
By
Cushman, Darby & Cushman
Attorneys

Inventor
Alfred Ernest Girling
By
Cushman, Darby & Cushman
Attorneys

United States Patent Office

3,482,230

Patented Dec. 2, 1969

3,482,230

MAGNETIC TAPE RECORDER FOR RECORDING ALTERNATE BLOCKS OF DIGITAL SIGNAL DATA ON THE SAME TRACK

Alfred Ernest Girling, Teddington, Tewkesbury, England, assignor to National Research Development Corporation, London, England Filed Nov. 14, 1966, Ser. No. 594,212

Claims priority, application Great Britain, Nov. 19, 1965, 49,273/65

Int. Cl. G11b *5/00;* B65h *17/42*

U.S. Cl. 340—174.1 11 Claims

ABSTRACT OF THE DISCLOSURE

A magnetic tape recorder for recording digital signal data at relatively high input rates without requiring large digital signal data stores comprises two set of recording heads, means for energizing the said two sets of recording heads alternately to record alternate blocks of digital signal data on the same set of recording tracks and control means for controlling the spatial relationship between said two sets of recording heads and magnetic recording tape so that the length of said magnetic recording tape between the said two sets of recording heads is increased during the recording of one block of signal data by the second of said sets of recording heads and is decreased during the recording of one block of signal data by the first of said sets of recording heads. Means are also provided for feeding auxiliary data to one of the sets of recording heads after it has recorded a block of data and during the time the immediately succeeding block of data is being recorded by the other set of recording heads. The tape control means may be controlled by incoming data signals. Means are also provided for erasing recorded data using one of the sets of recording heads.

Figure 1:
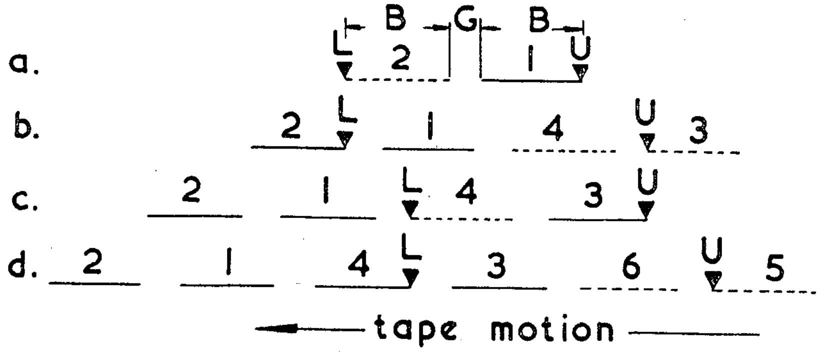

The present invention relates to magnetic tape recording devices. It is particularly useful when applied to incremental tape recorders for use with digital computers and the like.

The production of magnetic tape recordings for digital computers presents difficulties because, in order to enable a computer to suspend the feeding of data to it by a tape recorder, the data record must be broken down into blocks, with lengths (hereinafter called gap lengths) of recording tape on which no data is recorded between the blocks, in which gap lengths fast start/stop tape handlers can bring the tape to rest.

One known method of recording digital signal data in blocks is to employ a fast start/stop tape handler in conjunction with a buffer store for accommodating incoming signal data whilst transfer of signal data from the store to the tape is taking place. The buffer store must in this case be large enough to accommodate more than one block of signal data, so that the combination of the buffer store and tape handler is costly.

In an alternative know method of recording digital signal data, an incremental recorder is used which feeds the magnetic tape past the recording heads in increments. This may be achieved by using a stepping motor to drive the capstan of the recorder in discrete steps during each of which a frame of signal data is recorded. There are a number of frames of signal data in a block. The lengths of tape between blocks of data (that is to say, the tape gap lengths in which no data is recorded) are fed through the tape recorder at the same stepping speed as for recording. It follows that if signal data is being produced continuously, a buffer store must be provided to accommodate incoming signal data whilst the gap lengths are being formed. For some computer stores, the gap lengths may be as much as ¾ inches long. If the tape recorder records 200 frames per second at a spacing of 200 frames per inch, it will take ¾ seconds to form a gap length. A buffer store is, therefore, necessary. It may be shown that for a given input signal data rate, there is a minimum block length which may be used. Also, as the input signal data rate increases so does the necessary capacity of the buffer store and also the minimum block length, so that the buffer store becomes very expensive and the block length becomes unwieldy. At an input signal data rate of 200 frames per second, the minimum block length is infinity so that input signal data cannot be formed into blocks.

In another known method of incremental recording, the tape gap lengths are formed by feeding the tape quickly between blocks of data. The time necessary to create a gap in this way is of the order of 50 milliseconds so that for high-speed recording a small buffer store is necessary. The cost of maintenance of tape decks operating in this manner tends to be high.

It is an object of the present invention to provide a magnetic tape recorder for recording in blocks digital signal data at relatively high input rates without the necessity for large digital buffer stores.

It is a further object of the present invention to provide a magnetic tape recorder for recording digital signal data in blocks which is comparatively inexpensive to install in a computer system and is comparatively inexpensive to maintain.

According to the present invention, there is provided a magnetic tape recorder including two sets of recording heads, means for energising the two sets of recording heads alternately to record alternate blocks of digital signal data and means for controlling the spatial relationship between the two sets of recording heads and magnetic recording tape so that the length of magnetic recording tape between the two sets of recording heads is increased during the recording of one block of signal data by the second set of recording heads and is decreased during the recording of one block of signal data by the first set of recording heads.

According to a feature of the present invention there is provided a magnetic tape recorder including two sets of recording heads, the two sets of recording heads being arranged to be energised alternately to record alternate blocks of digital signal data in the same set of recording tracks, means for transporting magnetic recording tape to and from the sets of recording heads, and means for controlling the spatial relationship between the two sets of recording heads and the magnetic recording tape so that the length of magnetic recording tape between the two sets of recording heads is at the commencement of the recording of one block of signal data by the second set of recording heads, twice the length of tape occupied by a block of signal data plus once the required tape distance between blocks of signal data and is at the commencement of the recording of one block of signal data by the first set of recording heads, twice the length of tape occupied by a block of signal data plus three times the said required tape distance. The number of recording heads in each set is equal to the number of digits in each frame.

The required tape distance between blocks of signal data is normally equal to the required gap length between blocks of data. However, a block of data may be extended by recording auxiliary data at one end of a block of signal data by means of the set of recording heads which records the block of signal data, the auxiliary data being recorded on the magnetic recording tape during part of the time the other set of recording heads is recording an adjacent block of signal data. In that case, the required distance between blocks of signal data is the required gap length between blocks of data plus the length of magnetic recording tape occupied by auxiliary data. The auxiliary data may comprise, for example, information relevant to the signal data.

The two sets of recording heads are used alternately to record odd and even numbered blocks of data. The change-over of sets of heads recording signal data which is made at the end of each block of signal data may be accomplished in a few microseconds and in any case, in a time far less than the interval between successive elements of the input signal data. The above-described method of writing data into the tape results in the transposition on the tape of adjacent pairs of blocks. Therefore, the resultant block order is:

2, 1, 4, 3, 6, 5 etc.

The main stores of computers are, in general, capable of holding two blocks of data at one time and the increase in programme length required to process the blocks of data in correct order is very small.

According to a feature of the present invention, the two sets of recording heads may be stationary and the means for controlling the spatial relationship between the two sets of recording heads and the magnetic recording tape may include means for acting on the magnetic recording tape to vary the length of tape between the two sets of recording heads. The means for varying the length of tape between the two sets of recording heads may include a movable idler which pulls tape past a first set of recording heads whilst a second set of recording heads is recording data and releases tape past the second set of recording heads whilst the first set of recording heads is recording data, the direction of pulling and release being in the normal direction of movement of the tape. However, it is possible to devise a system for varying the length of magnetic recording tape between sets of recording heads in which the magnetic recording tape is relatively undisturbed and the effective distance between sets of recording heads is altered.

Figure 2:
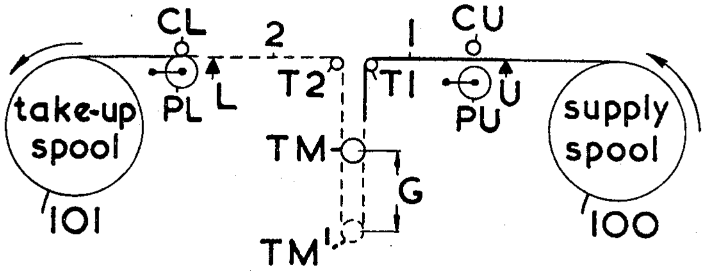
Figure 3:
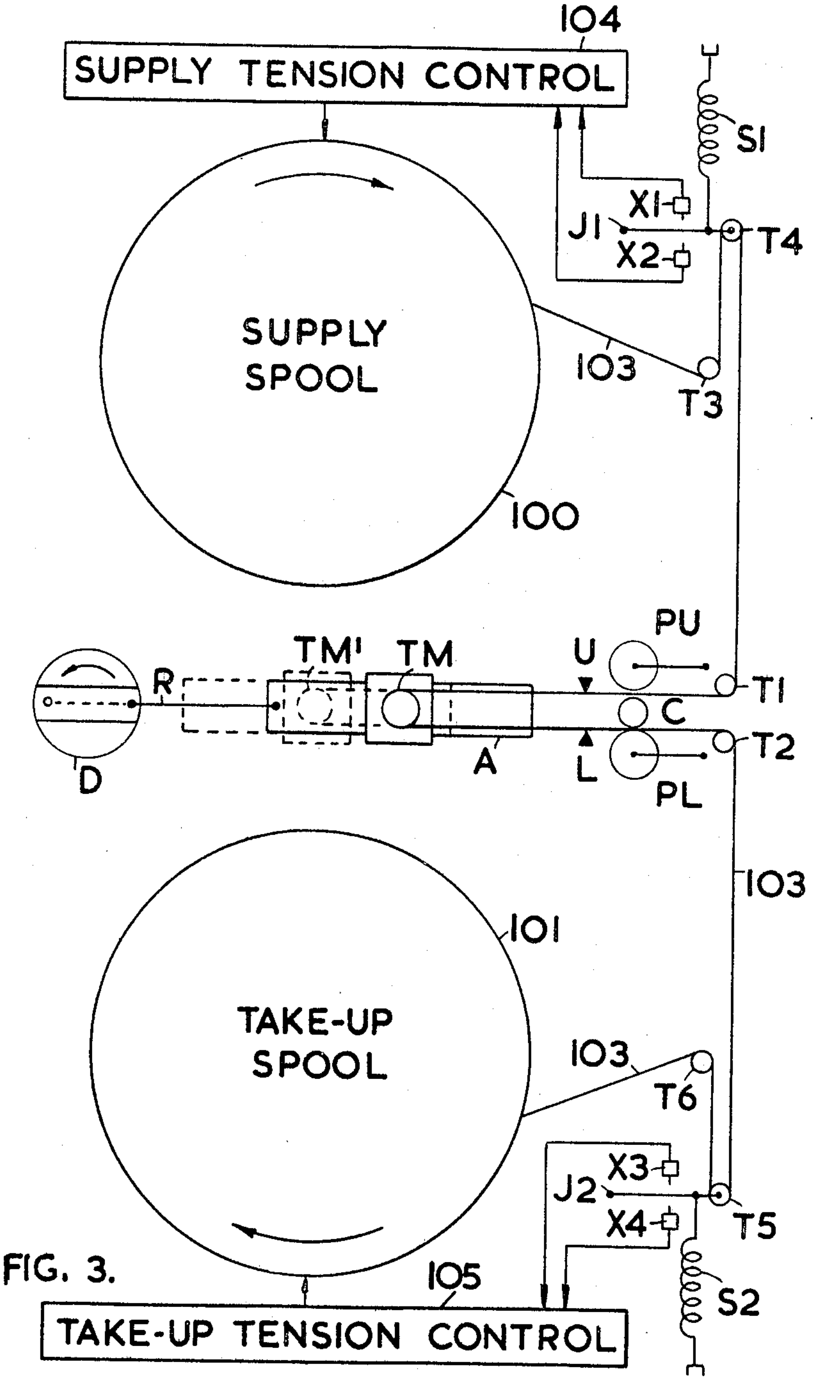
Figure 4:
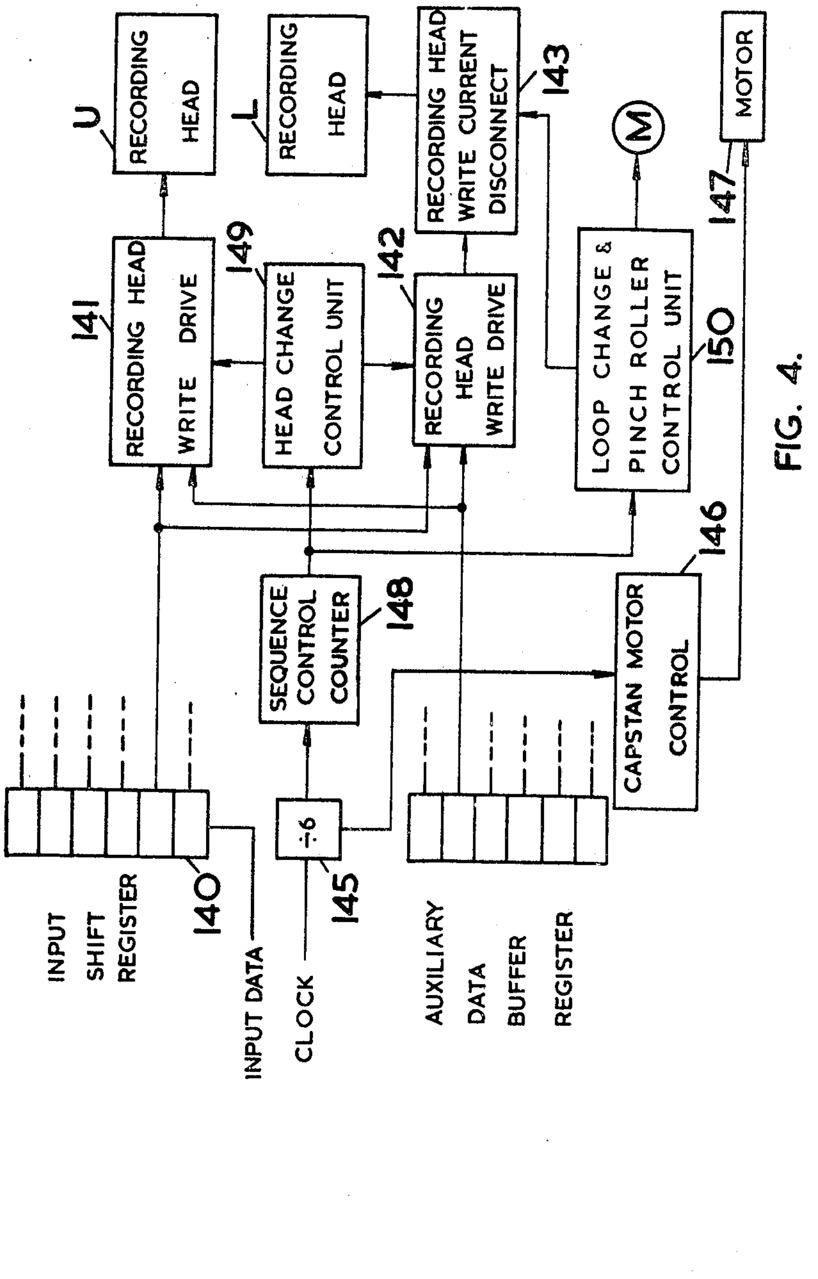
Figure 5:
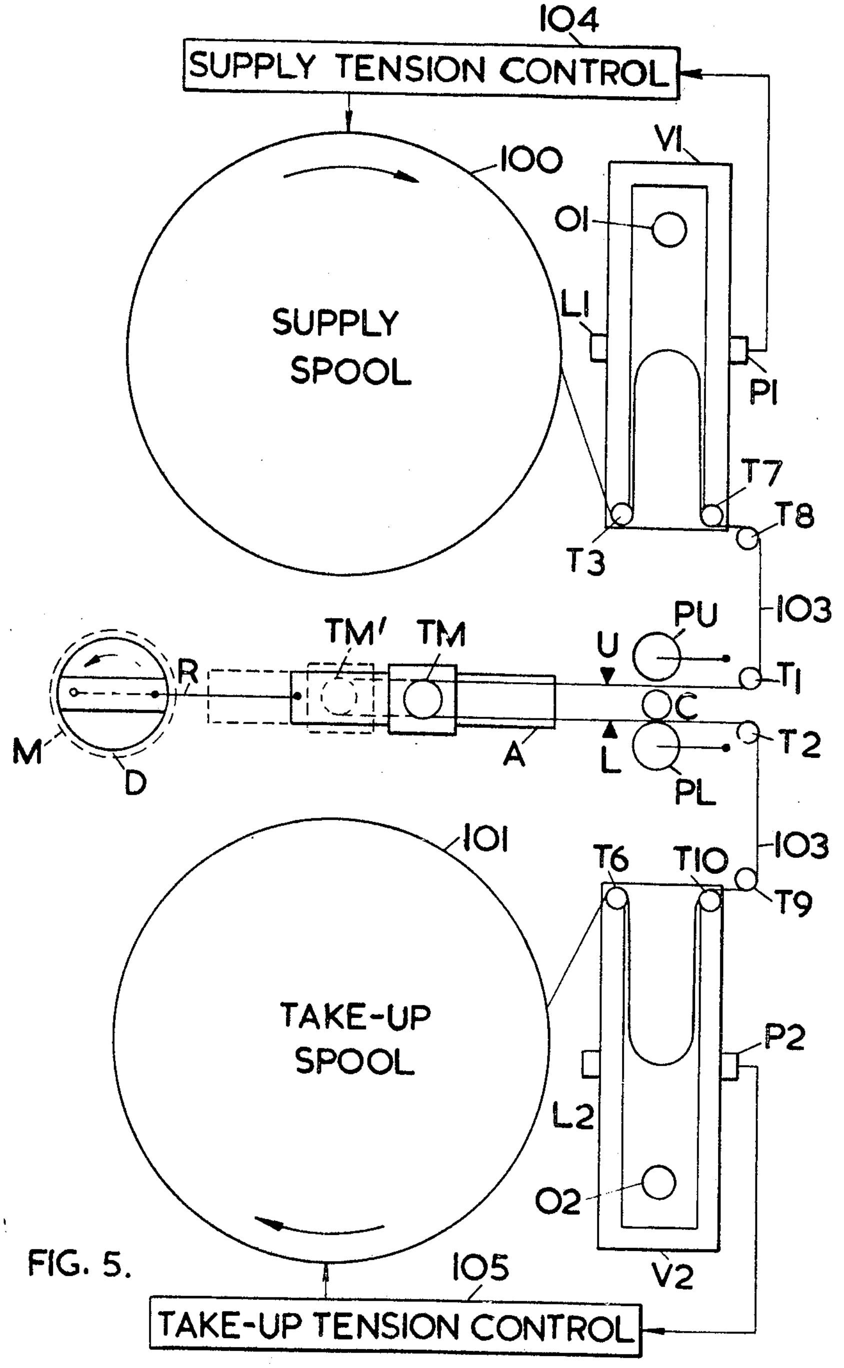

In order that the invention may be more readily understood, embodiments thereof will now be described with reference to the accompanying drawings, of which:

FIGURE 1 is a diagram illustrating a sequence of events in the recording of blocks of data on a magnetic tape, FIGURE 2 is a diagram of a rudimentary tape deck illustrating principles of operation of the tap deck, FIGURE 3 is a more detailed diagram of a tape deck, FIGURE 4 is a logical circuit diagram of a circuit for controlling, in an incremental recorder, the tape deck shown in FIGURE 3, and FIGURE 5 is a diagram of a modification of the tape deck shown in FIGURE 3.

FIGURE 1 illustrates the general principle of the invention, showing the position of recording heads relative to magnetic tape at the beginning and end of recorded blocks of signal data. For reasons of clarity, only one recording head of each set is shown. The recording heads which are shown of the two sets are designated L and U respectively. In FIGURE 1, the positions on the tape of the blocks of data already recorded are shown in solid lines and the positions on the tape of data to be recorded are shown in broken lines. The positions of the blocks of data on the tape are designated by the numerals 1 to 6, by way of example, in the order in which the data is written on to the tape. The normal direction of movement of the tape is from right to left in the drawing as indicated by the arrow.

FIGURE 1(*a*) shows the positions of the recording heads L and U relative to the tape immediately after the first block of signal data has been recorded by the recording head U and immediately before the second block of signal data is recorded by the recording head L. In FIGURE 1(*a*), B denotes the length of a block of signal data and G the gap length between blocks. It will be seen that the distance between the recording heads L and U in terms of length of tape is $(2B+G)$.

FIGURE 1(*b*) shows the positions of the recording heads L and U relative to the tap immediately after the second block of signal data has been recorded by the recording head L and immediately before the third block of signal data is recorded by the recording head U. It will be seen that the distance between the recording heads L and U in terms of length of tape is $(2B+3G)$. This may be realised by moving the recording head U a distance 2G to the right (as shown in the drawing) during the time the recording head L is recording the second block of data at normal recording speed. However, the same result may be achieved by maintaining the recording head U stationary and pulling a length 2G of recording tape past the recording head U whilst the recording head L is recording the second block of signal data at normal recording speed.

FIGURE 1(*c*) shows the positions of the recording heads L and U relative to the tape immediately after recording the third block of signal data and immediately before recording the fourth block of signal data. It will be seen that the distance between the recording heads in terms of length of tape is once against $(2B+G)$. This may be realised by moving the recording head L a distance 2G to the right (as shown in the drawing) during the time the recording head U is recording the third block of signal data at normal recording speed. However, the same result may be achieved by maintaining the recording head L stationary and releasing a length 2G of recording tape past the recording head L whilst the recording head U is recording the third block of signal data at normal recording speed.

FIGURE 1(*d*) shows the positions of the recording heads L and U relative to the tape immediately after the fourth block of signal data has been recorded and immediately before the fifth block of signal data is recorded. It will be seen that the distance between the recording heads L and U in terms of length of tape is once again $(2B+3G)$.

FIGURE 2 is a schematic diagram of a rudimentary tape deck illustrating one way of obtaining the tape movement required for operation in the mode illustrated in FIGURE 1. FIGURE 2 shows a supply spool 100 and a take-up spool 101. Magnetic tape from the supply spool 100 passes over a recording head U, between a capstan CU and a pinch roller PU, over an idler T1, over a movable idler TM, over a further idler T2, over a recording head L, between a capstan CL and a pinch roller PL and thence to the take-up spool 101. The capstans CU and CL are driven at the same stepping speed. The position of the movable idler TM is shown as that at the end of the recording of signal data block 1 by the recording head U and at the commencement of the recording of signal data block 2 by the recording head L as indicated by the thickened solid line 1 and the broken line 2. The position of the movable idler TM is such that the tape length between the recording heads L and U is $(2B+G)$. During the recording of the signal data block 1 the pinch roller PU has been clamping the tape to the capstan CU but at the instant depicted in the drawing is just releasing the tape. Also, at the beginning of the recording of the signal data block 1, the tape has been released by the pinch roller PL but at the instant depicted by the drawing is clamping the tape to the capstan CL. During the recording of the second block of signal data (which in a typical case would take 4 seconds), the movable idler TM will be caused to move a distance G to the position shown in dotted lines at TM′, thus pulling a length 2G of the tape past the recording head U. This may be done because the tape is not clamped to the capstan CU by the pinch roller PU. The length of recording tape between the two recording heads L and U thus becomes $(2B+3G)$ ready for the recording of the third block of signal data by the recording head U. After the length of tape has been changed, the pinch roller PU clamps the tape to the capstan CU. When the second block of signal data has been recorded by the recording head L, the pinch roller PL releases the tape. The pinch roller PU has already clamped the tape to the capstan CU ready for the recording of the third block of signal data by the recording head U. Whilst the third block of signal data is being recorded, the movable idler TM reverts to its position as shown at TM in FIGURE 2 so that the take-up spool pulls a length 2G past the recording head L and the length of tape between the recording head L and U once again reverts to $(2B+G)$. Thus the length of tape between recording heads L and U of the tape recorder is set for the recording of the fourth block of signal data by the recording head L. After the length of tape between the recording heads L and U has been changed, the pinch roller PL clamps the tape once again to the capstan CL.

FIGURES 3 and 4 are diagrams of a magnetic tape deck and its control circuits respectively showing how the principles set forth with reference to FIGURE 1 and 2 may be put into effect.

FIGURE 3 shows a supply spool 100. Tape 103 from the supply spool 100 passes over an idler T3 and then over an idler T4 supported on a jockey arm J1 which is tensioned by a spring S1. The jockey arm J1 is located between limit sensors X1 and X2 which actuate a tape supply tension control 104. The tape supply tension control 104 controls the supply spool motor (not shown) and thus the tension of the supply portion of the tape. From the idler T4 the tape passes over an idler T1 and thence between a capstan C and a pinch roller PU and over a recording head U to a movable idler TM. The tape 103 then passes over a recording head L and between the capstan C and a pinch roller PL. The tape 103 then passes over an idler T2 to an idler T5 supported on a jockey arm J2 which is tensioned by a spring S2. The tape 103 then passes over an idler T6 to a take-up spool 101. The jockey arm J2 is located between limit sensors X3 and X4 which actuate a tape take-up tension control 105. The take-up tension control 105 controls the take-up spool motor (not shown) and thus the tension of the take-up portion of the tape.

The movable idler TM is attached to a long back plate A which is slidable in guides (not shown) across the tape deck so that the idler TM may assume either of two positions TM and TM' (as shown by the broken lines in FIGURE 3). The position of the back plate A is controlled by a crank D attached to the back plate A by a connecting rod R. The crank D is rotatable so that it comes to rest alternatively in one of two positions. These are at top-dead-centre (as shown in the drawing) and bottom-dead-centre (rotated by 180 degrees from the position shown in the drawing). These two positions bring the movable idler TM alternately into the positions shown at TM and TM' respectively. The motion imparted to the idler TM is sinusoidal in form so that a too sudden motion, disturbing the tension of the tape, is not imparted to the tape at the commencement of the movement of the crank D from to-dead-centre to bottom-dead-centre and vice versa. Further the recording heads L and U are situated as close as possible to the capstan C in order to minimise the effect of any such disturbance in tape tension. The throw of the crank D may be adjusted so that the idler TM moves back and forth through the desired distance G. The initial position of the idler TM on the back plate A may be adjusted so that the length of tape between the recording heads L and U is $(2B+G)$ or $(2B+3G)$ depending on the position of the crank D.

Minor adjustments to the throw of the crank D and the initial position of the idler TM on the back plate A may be made to allow for tape stretch under operating conditions.

In the embodiment shown in FIGURE 3, only one capstan is used in association with the pinch rollers PU and PL. However, the operation of the pinch rollers PU and PL and indeed, of the movable idler TM is exactly the same as described with reference to FIGURE 2.

The movement of the crank D from top-dead-centre to bottom-dead-centre can be accomplished in one-half second, so that if it takes four seconds for one head to write a block of signal data, the remaining three and one-half seconds, or part thereof, may be employed by the other head in writing auxiliary data such as the block number. In order to do this, the effective block length must be increased to accommodate the auxiliary data whilst maintaining the required gap length between the extended blocks.

In one system of tape recording which may be employed using the tape recorder, the deck of which is illustrated in FIGURE 3, the input signal data is in streams of binary digits arranged in frames of six-digits. The digit signals are fed serially into a shift register or delay line and then extracted in parallel in frames of six digits, the digit signals of each frame being recorded simultaneously by a set of six recording heads. To do this, the recording heads L and U of the tape decks illustrated in FIGURES 2 and 3 are each replicated six times so that each frame of six digits is recorded transversely of the tape. The capstan C (FIGURE 3) steps on once each frame (that is to say once every six received digits or once every six input clock pulses). The input clock rate may be 1200 per second and the frame rate, therefore 200 per second. There may be 800 frames in a block so that it takes four seconds to record one block. It takes under one-half second to shift the movable idler TM from one position to the other so that there are approximately three and one-half seconds during which the recording head not recording the input signal data, can record auxiliary data.

FIGURE 4 is a logical circuit diagram showing the tape recorder control circuits for controlling the tape deck shown in FIGURE 3 in such a system as described above. FIGURE 4 shows an input shift register 140 for receiving signal data and converting each input serial frame of six digits into a parallel output to recording head write drives of two sets of six recording heads. Two of these recording head write drives, each associated with a recording head of a different set, are shown at 141 and 142. The output of the recording head write drive 141 is applied to the recording head U in one set of recording heads. The output of the recording head write drive 142 is applied through a recording head write disconnect circuit 143 to the recording head L in the other set of recording heads. There is also provided an auxiliary data buffer register 144 the outputs of which are connected to the recording head write drives of the two sets of recording heads. The input data clock signal is applied to a divider 145 which has an output at one-sixth of the clock rate. That is to say, the divider 145 has an output at the frame rate. The output of the divider is connected to a capstan stepping motor control unit 146 which controls a capstan stepping motor 147 so that it steps on once per frame.

The output of the divider 145 is also applied to a sequence control counter 148. The output of the sequence control counter 148 is applied to a recording head change control unit 149 which controls the recording head write drives 141 and 142. The output of the sequence control counter 148 is also applied to a loop change and pinch roller control unit 150.

The operation of the tape deck shown in FIGURE 3 and the tape recorder control circuits shown in FIGURE 4 will now be described for a typical sequence of events. Let it first be assumed that the recording head U has just recorded the last frame of the first block of signal data, that the pinch roller PL has already clamped the tape 103 to the capstan C and that the unit 143 has established write current in the recording head L. The head change control unit 149 causes the head write drive 142 to energise the recording head L with an output of the input shift register 140 and at the same time the head change control unit 149 causes the head write drive 141 to accept an input from the auxiliary data buffer register 144. Thus the first auxiliary data frame is written at the end of block 1 simultaneously with the first signal data frame of the second block. The second auxiliary data frame is written simultaneously with the second signal data frame et cetera. After the last frame of auxiliary data has been written by the recording head U, the unit 150, under the control of the sequence control counter 148, causes the pinch roller PU to release the tape 103. The pinch roller PL remains in position clamping the tape 103 to the capstan C. The recording head U erases any residual record on the tape 103. The unit 150 energises a motor M to cause the crank D to move from top-dead-centre to bottom-dead-centre, the tape 103 being drawn from the supply spool 100. After about one-half second, the unit 150 causes the pinch roller PU to clamp the tape 103 to the capstan C which moves the tape 103 past both recording heads while the recording head L continues to write signal data frames for block 2 and the recording head U erases the tape 103. At the instant when the last signal data frame of block 2 has been written by the recording head L the recording head U will be in the correct position relative to the tape 103 to start recording the next input signal data frame as the first signal data frame of block 3. At this same instant the head change control unit 149, under the control of the sequence control counter 148, causes the head write drive 141 to energise the recording head U with an output of the input shift register 140. The head change control unit 149 also causes the head write drive 142 to accept an input from the auxiliary date buffer register 144. As before, the auxiliary data frames are written at the end of block 2 simultaneously with the first signal data frame of block 3. When the last auxiliary data frame has been written by the recording head L, the recording head write current disconnect unit 143 prevents write current from flowing in the recording head L in order that the recording head L should not erase data already recorded by the recording head U. The unit 150 causes the pinch roller PL to release the tape 103. The unit 150 also energises the motor M to cause the crank D to move from the bottom-dead-centre to top-dead-centre so that the tape 103 is released to the take-up spool 102. After about one-half second, the unit 150 causes the pinch roller PL to clamp the tape 103 to the capstan C. Recording of input signal data by the recroding head U continues until the last input signal data frame of block 3 is written when the unit 143 re-establishes write current in the record head L and the above-described sequence may then start afresh.

The block length on the tape must be set by an initial adjustment of the throw of the crank D and by the positioning of the moving idler TM to allow for the increase in block length due to the additional frames of auxiliary data.

Although the frames of the auxiliary data are recorded immediately after the frames of the signal data to form a block of increased size, in calculating the initial setting and the necessary movement of the movable idler TM the length of tape occupied by the auxiliary data frames is added to the required gap length G between blocks. This is because the auxiliary frames are recorded by one recording head during the time the next block of signal data is recorded by the other recording head. Thus, if the length of tape occupied by the auxiliary data frames is A, the length of tape between the recording heads L and U must vary between $(2B+A+G)$ and $(2B+3A+3G)$. That is to say, there must be a variation of $(2A+2G)$. It follows that the movement of the movable idler TM between the recording of successive data blocks must be $(A+G)$.

The whole sequence of events involving the units 149 and 150 is controlled by the sequence control counter 148 which counts the number of frames and thus provides suitable outputs at the end of data blocks et cetera.

Although it has been hereinbefore suggested that the tape recorder might record 200 frames per inch, clearly a recorder can be made to record other frame densities by changing the diameter of the capstan. Also it has been assumed above that a recording head normally has a continuous write current applied to it. Clearly, however, return-to-zero recording techniques may be used. In that case, the unit 143 may be omitted from the control circuits of FIGURE 4.

The embodiment described with reference to FIGURE 3 has the disadvantage that the inertia of the jockey arms J1 and J2 and their associated idlers may be so great that they do not respond adequaely to the rapid starting and stopping action of simple take-up spool and supply spool motors. This can be overcome by providing proportional servo and sensing arm systems in place of simple spool motors and the limit sensors X1 to X4. Alternatively, the tape deck arrangement shown in FIGURE 5 may be employed.

FIGURE 5 shows a tape deck many of the features of which are similar to those shown in FIGURE 3. Those parts of the tape deck of FIGURE 5 which are similar in form and function to those shown in FIGURE 3 bear similar reference characters and will not now be described in detail. The main difference between the embodiments shown in FIGURES 3 and 5 is that the jockey arms J1 and J2, the limit sensors X1 to X4 and the springs S1 and S2 are replaced by two vacuum columns V1 and V2 of known type. The magnetic tape 103 now passes from the supply spool 100 over an idler T3 into the vacuum column V1, out of the vacuum column V1 over idlers T7, T8 and T1, between the capstan C and the pinch wheel PU, over the recording head U and round the movable idler TM. It then passes over the recording head L, between the capstan C and the pinch wheel PL, over idlers T2, T9 and T10 into the vacuum column V2 and out of the vacuum column V2 over the idler T6 to the take-up spool 101.

The vacuum columns V1 and V2 are both chambers arranged to receive a loop of tape. A loop of tape is drawn into each of the columns by extracting air through orifices O1 and O2 respectively by means of an extraction fan (not shown). Half-way along a side wall of each vacuum column is a lamp (L1 and L2) and in the opposite side wall of each vacuum column is a photo-electric cell (P1 and P2). The outputs of the photo-electric cells P1 and P2 are applied to the supply tension control 104 and the take-up tension control 105 respectively to control them in the following manner. When the loop of the tape in the vacuum column V1 is long enough to interrupt the light path between the lamp L1 and the photo-electric cells P1, the tape supply spool is stopped until the light path is re-established. Also, when the loop of tape in the vacuum column V2 is long enough to interrupt the light path between the lamp L1 and the photo-electric cell P2, the take-up spool is started and runs until the light path is re-established. By this means, a substantially constant tension of the tape past the writing heads U and L is maintained.

FIGURE 5 also shows in dotted lines the motor M which drives the crank D. The motor M is situated below the crank on the under side of the tape deck. The crank D may also be placed on the under-side of the tape deck if this is desired.

In describing FIGURE 4 it was assumed that the recorder was an incremental recorder with a stepping motor 147 driving the capstan C (FIGURE 3). At very high signal data recording speeds trouble may be caused by tape inertia as the capstan C is stepped round. This difficulty may be overcome, if the incoming data is continuous, by driving the capstan C at a constant speed controlled by the incoming data rate. In this case, the output of the divider 145 is applied to a capstan motor the connections being similar to those interconnecting the parts 145, 146 and 147 shown in FIGURE 4. A motor and servo system similar to those already used in some tape recorders for correcting record-to-replay tape speed variations may be used for the motor and motor control in such a continuous tape motion system.

It will be understood that because the moving idler TM takes time to move from one position to the other, the minimum block length obtainable will increase as the input data rate increases. The time taken by the moving idler TM to move is somewhat less that 0.5 seconds. Thus, for example, the minimum block length for an input data rate of 1000 bits/sec. (166 frames/sec.) is 83 frames whilst that for an input rata rate of 50,000 bits/sec. (8333 frames/sec.) is approximately 4150 frames.

I claim:

1. A magnetic tape recorder comprising a first set of recording heads, a second set of recording heads, means for transporting a single magnetic recording tape past the first set of recording heads and then past the second set of recording heads so that either the first set or the second set of recording heads may be used to record signals in the same set of parallel tracks on the recording tape, signal switching means for energizing the first set of recording heads and the second set of recording heads alternately to record blocks of digital signals from a common source onto the said set of tracks so that odd-numbered blocks will be recorded through one of the said sets of recording heads and even-numbered blocks will be recorded through the other of the said sets of recording heads, and control means connected to the signal switching means for controlling the spatial relationship between the said sets of recording heads and the tape so that the length of the tape between the first set of recording heads and the second set of recording heads is increased while the second set of heads is energized and is decreased while the first set of heads is energized.

2. A magnetic tape recorder comprising a first set and a second set of recording heads, means for energizing said sets of recording heads alternately to record alternate blocks of digital signal data in the same substantially parallel recording tracks, means for transporting magnetic recording tape over the first and then the second of said sets of recording heads and means for controlling the spatial relationship between the said sets of recording heads and the said magnetic recording tape so that the length of magnetic recording tape between the two said sets of recording heads is, at the commencement of the recording of one block of signal data by the second of said sets of recording heads, twice the length of the tape occupied by a block of signal data plus once the required tape distance between blocks of signal data and is, at the commencement of the recording of one block of signal data by the first of said sets of recording heads, twice the length of tape occupied by a block of signal data plus three times the said required tape distance.

3. A magnetic tape recorder as claimed in claim 2 wherein there is provided means for feeding auxiliary data to one of said sets of recording heads after they have recorded a block of signal data and while the immediately succeeding block of signal data is being recorded by the other of said sets of recording heads, the said required tape distance being equal to the required gap length between blocks of data plus the length of magnetic recording tape occupied by said auxiliary data.

4. A magnetic tape recorder as claimed in claim 2 wherein the said two sets of recording heads are stationary and said means for controlling the spatial relationship between the two sets of recording heads and the magnetic recording tape comprise means operably acting on the magnetic recording tape for varying the length of the tape between the two sets of recording heads.

5. A magnetic tape recorder as claimed in claim 4 wherein the means for varying the length of tape between the two sets of recording heads comprises movable idler means cooperating with said magnetic recording tape and means operably connected to said movable idler means for causing said movable idler means to pull magnetic recording tape past a first set of recording heads while a second set of recording heads is recording signal data and to release magnetic recording tape past the second set of recording heads while the first set of recording heads is recording signal data, the direction of pulling and release being in the normal direction of movement of the magnetic recording tape.

6. A magetic tape recorder as claimed in claim 5 wherein there are provided a first capstan and a first pinch roller adjacent the first set of recording heads, a second capstan and a second pinch roller adjacent the second set of recording heads, sequence control means controlled by incoming data and means connected to said sequence control means for causing said first pinch roller to clamp magnetic recording tape to said first capstan when said first set of recording heads is recording and for causing said second pinch roller to clamp said magnetic recording tape to said second capstan when said second set of recording heads is recording.

7. A magnetic tape recorder as claimed in claim 5 wherein there are provided a capstan adjacent the said two sets of recording heads a first pinch roller adjacent the capstan and located to engage magnetic recording tape moving towards said movable idler, a second pinch roller adjacent the capstan and located to engage magnetic recording tape leaving said movable idler, sequence control means controlled by incoming data, and means connected to said sequence control means for causing said first pinch roller to clamp said magnetic recording tape to said capstan when said first set of recording heads is recording and for causing said second pinch roller to clamp said magnetic recording tape to said capstan when the second set of recording heads is recording.

8. A magnetic tape recorder as claimed in claim 5 wherein there are provided a crank, a connecting rod connecting said crank to said movable idler, a motor connected to said crank and means for energising said motor after each block of data has been recorded.

9. A magnetic tape recorder as claimed in claim 2 wherein there is provided at least one capstan for feeding magnetic recording tape past said sets of recording heads in incremental steps.

10. An incremental magnetic tape recorder comprising a first set and a second set of recording heads, means for energizing said sets of recording heads alternately to record alternate blocks of signal data in the same set of substantially parallel recording tracks a capstan adjacent said two sets of recording heads, a first pinch roller adjacent the capstan, a second pinch roller adjacent the capstan, a movable idler, means for transporting magnetic recording tape to travel between said capstan and said first pinch roller, past said first set of recording heads, over said movable idler, past the said second set of recording heads and then between said capstan and said second pinch roller and means connected to said movable idler for causing it to move and to increase the length of magnetic recording tape between said two sets of recording heads by twice the required tape distance between blocks of signal data when said second set of recording heads is recording signal data and to decrease the said length by twice the required tape distance when the said first set of recording heads is recording signal data.

11. A magnetic tape recorder as claimed in claim 2 wherein there is provided means for continuously energizing one of the said sets of recording heads for a predetermined time prior to any recording of digital data so that previously recorded matter is erased.

References Cited

UNITED STATES PATENTS

| | | | |
|---|---|---|---|
| 2,941,036 | 6/1960 | Honolua | 179—100.2 |
| 3,118,235 | 1/1964 | Ley | 179—100.2 |
| 3,283,068 | 11/1966 | Urry | 179—100.2 |
| 3,364,495 | 1/1968 | McFadden | 340—174.1 |

STANLEY M. URYNOWICZ, Jr., Primary Examiner
GARY M. HOFFMAN, Assistant Examiner

U.S. Cl. X.R.

179—100.2; 226—114